US005564812A

United States Patent [19]

Berardi

[11] Patent Number: 5,564,812

[45] Date of Patent: Oct. 15, 1996

[54] CONTROL KNOB DIAL ILLUMINATION

[76] Inventor: Philip N. Berardi, 1231 Euclid Ave. #4, Santa Monica, Calif. 90404

[21] Appl. No.: 305,058

[22] Filed: Sep. 13, 1994

[51] Int. Cl.[6] .................. G01D 11/28

[52] U.S. Cl. .................. 362/23; 362/5; 362/84; 116/310; 116/DIG. 35

[58] Field of Search .................. 362/5, 8, 23, 29, 362/30, 84; 116/284, 286, 298, 299, 309, 310, DIG. 35; 354/289.1, 289.12

[56] References Cited

U.S. PATENT DOCUMENTS

| | | | |
|---|---|---|---|
| Re. 24,999 | 6/1961 | Kirsten | 116/286 |
| 3,069,509 | 12/1962 | Sharron | 362/84 |
| 3,254,534 | 6/1966 | Graham | 362/84 |
| 3,738,239 | 6/1973 | Higuchi | 362/5 |
| 4,172,333 | 10/1979 | Towsend | 40/544 |
| 4,895,455 | 1/1990 | Horning | 116/310 |
| 5,005,306 | 4/1991 | Kinstler | 40/591 |
| 5,339,550 | 8/1994 | Hoffman | 40/544 |

FOREIGN PATENT DOCUMENTS

| | | |
|---|---|---|
| 2233139 | of 1991 | United Kingdom . |

*Primary Examiner*—Denise L. Gromada
*Assistant Examiner*—Y. Quach
*Attorney, Agent, or Firm*—Jones, Day, Reavis & Pogue

[57] ABSTRACT

A device for backlighting a plastic panel associated with a control knob and carrying indicia thereon for illumination by an electroluminescent panel under the plastic panel containing the indicia with the electronic circuitry for illuminating the electroluminescent panel being contained within the hollow control knob. A light-responsive device may be used to maintain the circuit in the OFF position until the ambient light intensity fails below a predetermined level.

7 Claims, 4 Drawing Sheets

CONTROL KNOB DIAL ILLUMINATION

BACKGROUND OF THE INVENTION

1. Field of the Invention

The present invention relates to control knob dial illumination in general and in particular to the use of an electroluminescent panel surrounding, a part of, or adjacent to, a control knob such that when the control knob is to be positioned in insufficient light or in darkness, the electroluminescent panel may be illuminated to illuminate the dial so that proper settings can be made.

2. Description of Related Art

During the filming of a movie or other type of film or video production, the responsibility of the camera assistants or operators is to focus the camera. This is done by turning a control knob on the side of the camera. By turning this control knob, the assistant or operator may change the focal length of the camera lens or cause the camera to perform other functions. For instance, if an individual being filmed were to walk from a position ten feet from the camera to a position three feet from the camera, the camera assistant or operator must turn the control knob to change the focal length so that the individual will stay in focus. In the situation just described, the camera assistant or operator would mark on a plastic disk, associated with the knob that he must turn, some type of reference mark indicating, for example, three feet, five feet, seven feet, nine feet, and the like. By this means he would know how far to turn the control knob for a particular distance. When these marks on the disk line up with a stationary witness or reference mark on the body of the camera or the body of the remote control unit, the camera is focused at the indicated distance. These marks are always changing when particular shots, lenses, angles, or subjects change. Thus there is a constant need to correct the data on the disk associated with the control knob.

In many cases, remote servo lens controls are used for the same purpose as the controls that are actually on the camera. Such controls are used when the assistant or operator is unable to move with or work next to the camera. Sometimes because the camera is moving freely or because it is mounted in a way that the assistant or operator could not get to it, such as when the camera is mounted on some type of crane, a remote servo controller would be used. Most of these remote servo controllers have a disk or similar surface on which selected indicia is placed by the assistant or operator. Thus by turning the control knobs on the remote servo control boxes, the assistant or operator can focus, zoom in or out, and change iris settings on the camera lens from a distance. Again, each of these control knobs have a removable and replaceable annular disk associated with the control knob on which indicia can be placed by the operator or camera assistant to indicate where the control knob must be positioned for a given situation.

The current problem of not being able to see these controls and their associated indicia carrying disks in low or no light is solved by the assistant or operator shining a small flashlight on the disk. Otherwise he may use a rather clumsy accessory light on the camera itself. However, none of these methods illuminate the disk associated with the control knob or utilize a backlighting feature.

Panels for use in backlighting are well known in the art and include such panels as electroluminescent panels. These devices glow with different colors depending upon the material from which they are constructed and have been used for many purposes. In U.S. Pat. No. 3,738,239, an electroluminescent element is placed under an exposure calculating dial of an electronic flash or camera to illuminate the scale portions of a camera to permit reading of the camera scales in little or no light. In Patent '239, the electroluminescent material is placed under the rotating dial and the entire dial is illuminated as it is rotated. However, such backlighting of disks surrounding a control knob or associated with a control knob either on an object such as a camera or on an object such as a remote servo control unit, creates special problems that need to be addressed such as the connection of control circuits to the electroluminescent panel. Further, it would be desirable to retrofit existing units that have plastic disks associated with the control knob.

SUMMARY OF THE INVENTION

The present invention provides a device to backlight the disks associated with control knob dials so they can be seen in a low or no light situation. These disks are generally formed of at least a semitransparent plastic on which a marker can be used to place indicia. At least four types of the disks or indicia bearing plastic devices are used. The first type of disk removably surrounds substantially the base of a hollow dial control knob and rests on a annular shoulder extending outwardly perpendicular to the longitudinal axis of the control knob. The plastic disk is retained on the shoulder by a locking device such a spring-loaded ball bearing. When necessary, the plastic annular ring or disk can be removed and replaced around the control knob.

The second type of disk is positioned in a hollow dial knob with an upper substantially flat surface covering the hollow interior. An annular recess is formed in the substantially flat surface of the dial knob and a flat annular plastic ring is placed in and removably attached to the annular recess for rotational movement relative to the dial knob itself.

In a third embodiment, a strip of at least semitransparent plastic is wrapped around the rotatable knob shaft in a space between the hollow control knob and the object to which the shaft is attached. Indicia on the plastic strip can be related to a fixed indicia on the body of the device to which the control knob is attached.

In the fourth embodiment an elongated rectangular strip of plastic is attached to the housing of a remote servo lens control unit.

In the first three embodiments, the control knob rotates about and is concentric with a stationary shaft extending outwardly from the body to which the control knob is attached. An electroluminescent strip or panel is placed under and is coterminous with the plastic strip. Electrical leads from the electroluminescent panel can be inserted through an orifice in the knob housing to the interior thereof to make contact with a power circuit and battery located therein to illuminate the electroluminescent panel and backlight the transparent plastic strip to expose the indicia thereon. If desired, a manually operated switch such as a push button switch and/or a photodiode can be placed in the upper surface of the dial knob to be coupled to the control or power circuit.

In the fourth embodiment, a strip or panel of electroluminescent material is placed in superimposed relationship under the plastic strip. Orifices in the housing accept the electrical leads from the electroluminescent panel to the interior of the housing where the batteries and power circuit can be placed. In addition, a manually operated switch or a photodiode can be placed on the housing body with leads extending through orifices in the housing to make appropriate contact with the circuit internal of the housing. In this case, a sliding indicator knob having a reference mark can be moved longitudinally parallel to the plastic sheet on which indicia has been placed in order to make the proper settings.

Thus it is an object of the present invention to provide a back-lit illumination means for illuminating a marking strip associated with a control knob, the marking strip having indicia thereon with the control knob having corresponding reference marks so that, when the marks on the plastic strip line up with the witness or reference mark on the knob, the controls will be properly set for a given condition.

It is still another object of the present invention to backlight an electroluminescent strip for proper setting of a control knob under insufficient lighting conditions wherein the circuit for the electroluminescent panel and power source is housed within the control knob.

It is still another object of the present invention to provide backlighting for a marking strip for a control knob that has a circuit that may be manually activated and/or controlled automatically by a light-level detecting device that enables the circuit only after the light level has fallen below a predetermined intensity.

Thus the invention relates to a device for enabling proper setting of a dial knob on a body with respect to a reference point on the body in insufficient light to see indicia on the dial knob. The device comprises a dial knob having a hollow interior and a shaft coupled to the body for causing an effect in the body when the dial knob is rotated. A flat plastic ring of at least semitransparent plastic material is carried by the dial knob and includes indicia thereon that may be preprinted thereon or added by the device user. A flat electroluminescent ring having power leads is placed under the flat plastic ring. An electronic circuit and power supply are connected to each other and placed within the hollow knob with the electronic circuit having output leads connected to the electroluminescent ring power leads. An operable switch is provided for coupling the power supply to the electronic circuit for energizing the electroluminescent ring such that the indicia on the flat plastic ring are visible in the dark to allow proper rotation of the dial knob with respect to the reference point in darkness.

BRIEF DESCRIPTION OF THE DRAWINGS

These and other more detailed objects of the present invention will be disclosed in the following DETAILED DESCRIPTION OF THE DRAWINGS in which like numerals represent like elements and in which.

DETAILED DESCRIPTION OF THE DRAWINGS

Figure 1:
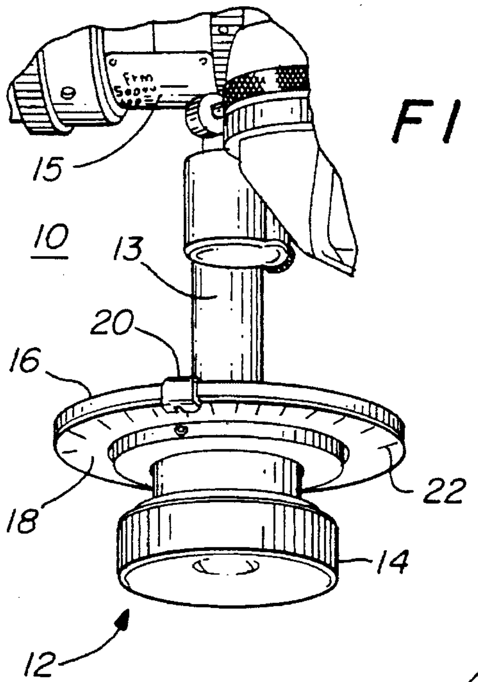
FIG. 1 is an isometric view of a control knob for attachment to an element of a camera for controlling an operation and illustrating an annular plastic disk associated with a reference mark so that, as the knob is rotated under insufficient fighting conditions, indicia on the plastic strip can be aligned with the reference mark using backlighting for proper control setting.

FIG. 1 illustrates a camera assembly 10 including a control knob assembly 12 that may be modified and used with the present invention. It includes a knob 14 attached by a shaft 13 to a body or housing 15 that may be, for instance, a camera. At the base of the knob 14 is a flat annular shoulder 16 that extends outwardly from the outer circumference of the dial knob and shaft 13 and has an outer diameter R and an inner diameter r, respectively as shown in FIG. 5. This flat annular shoulder 16 supports a fiat annular electroluminescent ring (shown in FIG. 5) and a fiat plastic annular ring 18 carrying indicia 22 thereon. The fiat plastic annular ring 18 is made of at least semitransparent plastic material. The indicia 22 on the fiat plastic annular ring 18 can be compared to a reference mark 20 attached to the body housing 15. Thus, as the hollow knob 14 is rotated, the flat annular plastic ring 18 and its associated electroluminescent annular ring (shown in FIG. 5) are carried by support shoulder 16 in relation to the reference mark 20. The electronic circuit and power supply for the electroluminescent panel are mounted in the hollow knob or housing 14 as will be shown in relation to FIGS. 4 and 5. Thus in the darkness, the electroluminescent ring will cause a sufficient light through the plastic annular ring 18 to illuminate the indicia 22 so that the knob can be properly set in darkness.

Figure 2:
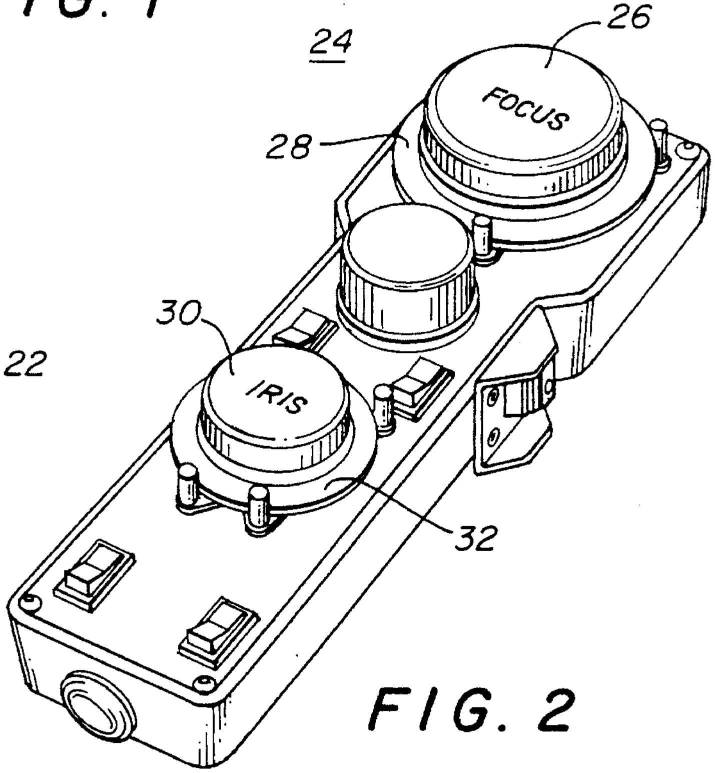
FIG. 2 illustrates a remote lens controller including a focus knob and an iris setting knob each of which has a white annular plastic strip associated therewith for providing indicia thereon so that, when the appropriate knob is rotated under insufficient lighting conditions, indicia on the plastic annular strip can be made to line up with the reference mark using backlighting to obtain proper settings.

FIG. 2 illustrates a remote control device for a camera for controlling both the focus of the camera and the iris. The device 24 includes a focus knob 26 having extending from its base the plastic annular ring 28 that is illuminated by the electroluminescent panel as will be explained hereafter. In like manner, the iris control knob 30 has surrounding it the plastic annular ring 32 that is illuminated by an electroluminescent panel as will be disclosed hereafter.

Figure 3:
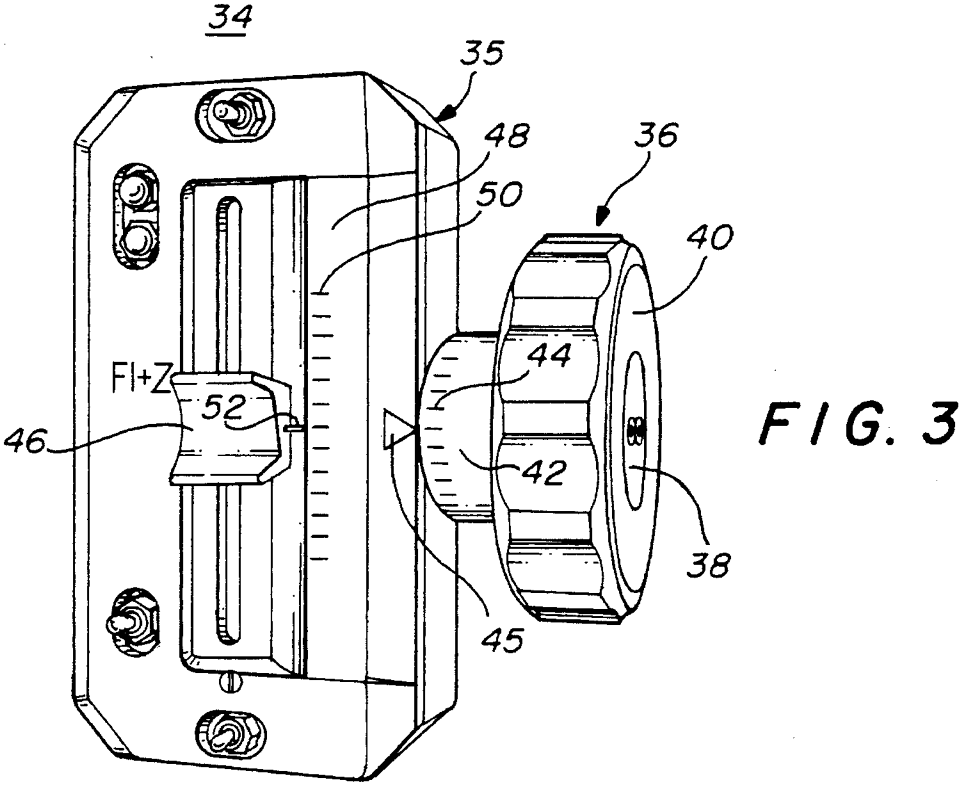
FIG. 3 is an isometric view of a third type of remote control for setting the focus and the iris of a camera and that uses a control knob having a substantially flat upper surface covering a hollow interior and an annular recess in the upper substantially flat surface of the dial knob and a first substantially flat electroluminescent annular ring covered by the flat plastic annular ring that is placed in and attached to the annular recess of the upper flat surface for movement with respect to the dial knob such that a reference mark on the dial knob may be lined up with indicia on the substantially transparent white plastic annular strip, a second flat electroluminescent ring surrounding a hollow shaft attached to the dial knob with a flat plastic ring being attached to and covering the electroluminescent ring and carrying indicia that can be compared to a reference mark on the housing of the remote control unit as the dial knob is rotated, and including a third elongated rectangular strip of electroluminescent panel covered by an elongated at least semitransparent rectangular strip of plastic material having indicia thereon such that slidable movement of a knob associated therewith causes the reference point on the knob to move in relation to the indicia carried by the rectangular strip of plastic material.

FIG. 3 illustrates another embodiment of a remote camera control device 34. It has three different types of plastic surfaces thereon that can carry indicia for the proper setting of a control knob and that are illuminated by an electroluminescent panel of the present invention such that the control knobs can be properly set in darkness. The control knob 36 is a hollow control knob that has an upper substantially flat surface 38 covering the hollow interior. An annular recess is formed in the upper substantially flat surface 38 and a flat electroluminescent ring covered by a flat plastic annular ring 40 are placed in it and attached to the annular recess of the upper flat surface 38 as will be shown in more detail in FIG. 10 and FIG. 11. A control circuit and power supply are placed within the hollow interior of the knob 36 for providing power to the electroluminescent panel as will be shown hereafter in relation to FIGS. 4 and 5.

Figure 8:
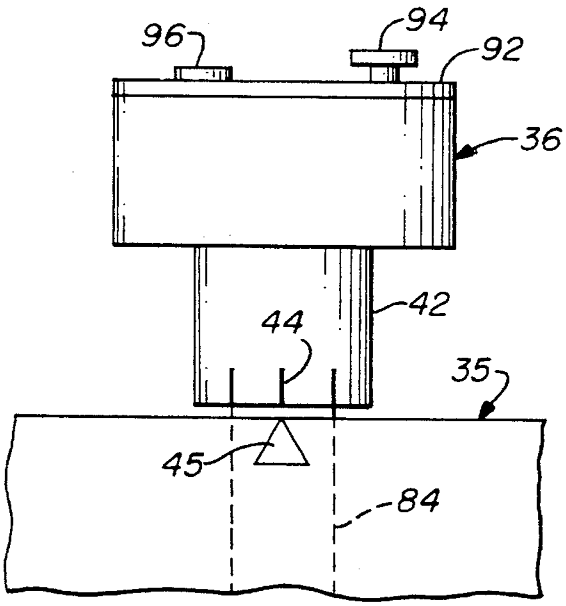
FIG. 8 illustrates another embodiment of the present invention in which the electroluminescent panel and its associated at least partially transparent plastic panel are wrapped around the shaft of the control knob to provide indicia thereon for comparison with a reference mark on the body of the device to which the control knob is attached.
Figure 9:
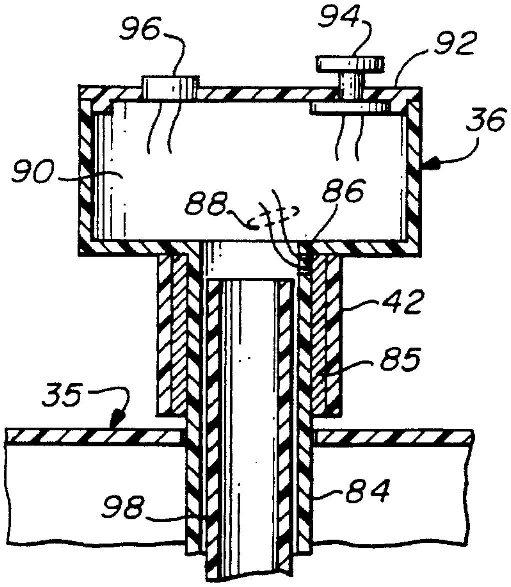
FIG. 9 is substantially a cross-sectional view of the control knob of FIG. 8 to illustrate the construction of the electroluminescent panel and its associated plastic panel surrounding the shaft.

In addition, the knob 36 has a hollow shaft extending into the body 35 of unit 34 and is of sufficient length to hold the dial knob 36 a spaced distance away from the body 35. A flat electroluminescent ring surrounds the hollow shaft in the spaced distance between the body 35 and the hollow dial knob 36. A flat plastic ring or strip 42 is attached to and covers the electroluminescent ring as illustrated in FIGS. 8 and 9 hereafter. As will be seen therein, orifices in the hollow shaft receive the electroluminescent ring power leads for connection to the electronic circuit output leads in the hollow knob 36 for illuminating any indicia 44 on the flat plastic ring 42 so that the indicia can be related to a reference mark 45 on the body 35.

Figure 12:
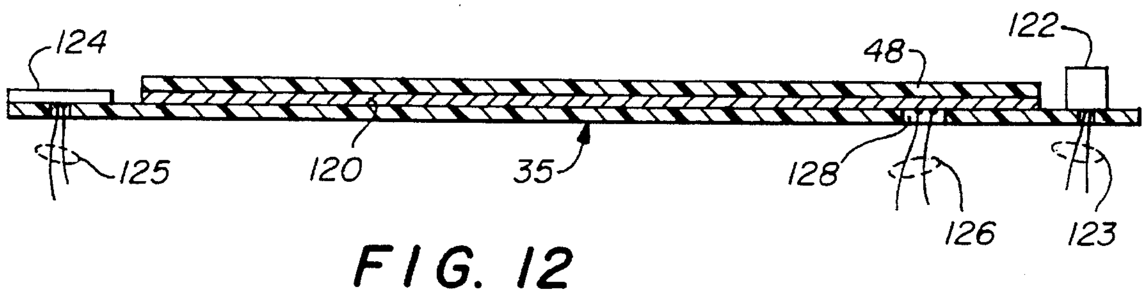
FIG. 12 is a cross-sectional view of a body housing on which an elongated electroluminescent strip is placed with a corresponding flat plastic strip superimposed thereon and used with the embodiment illustrated in FIG. 3 with a slidable control knob and illustrating a mechanical switch and a photodiode that may be used to control the electroluminescent panel.

The unit 34 also has a slidable knob 46 on the body 35 for slidable movement along a path in opposite directions to control an effect in said body. A reference point 52 is placed on the slidable knob 46. An elongated rectangular strip of electroluminescent panel having power leads as shown in FIG. 12 is attached to the body 35 adjacent to slidable knob 46 and parallel to the path of movement of the slidable knob 46. An elongated, at least semitransparent, rectangular strip of plastic material 48 covers and is attached to the elongated rectangular strip of electroluminescent panel. The rectangular strip of plastic material 48 carries indicia 50 thereon such that slidable movement of the knob 46 causes the reference point 52 thereon to move in relation to the indicia 50 carried by the rectangular strip of plastic material 48. An electronic circuit is coupled to the electroluminescent panel for illuminating the same. The circuit may be placed either in the hollow interior of knob 36 with the control leads extending through the hollow shaft to the interior of the body 35 or may be placed within the body 35 itself.

Figure 4:
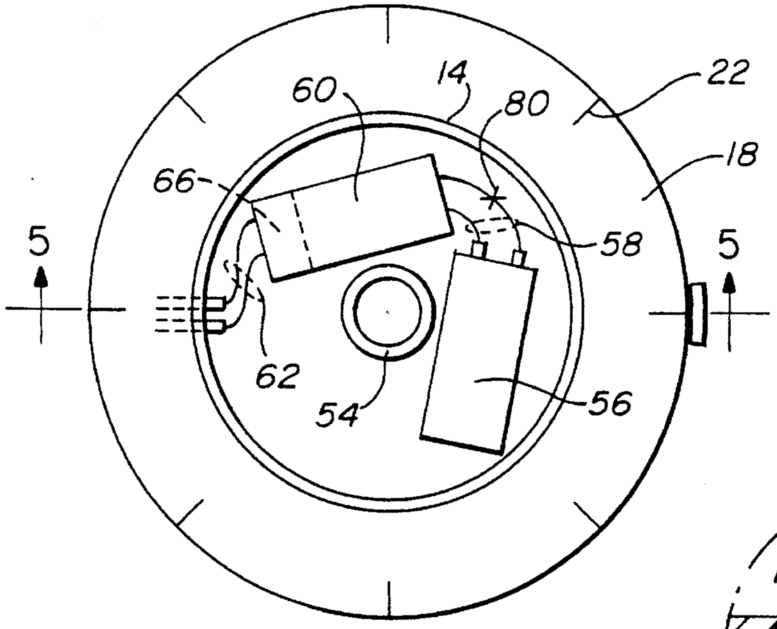
FIG. 4 is a top view of a hollow control knob of the present invention illustrating the electronic circuit and power supply therein that is connected to the electroluminescent annular ring placed under the annular transparent plastic ring having indicia thereon as illustrated in FIGS. 5 and 6.
Figure 6:
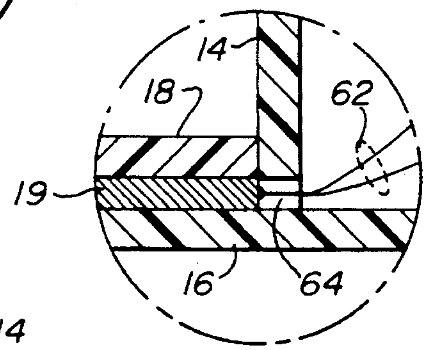
FIG. 6 is an enlarged view of a portion of FIG. 5 to illustrate how the electronic leads from the annular electroluminescent panel pass through an orifice in the wall of the control knob for connection to the power supply and control circuit inside the hollow knob.
Figure 5:
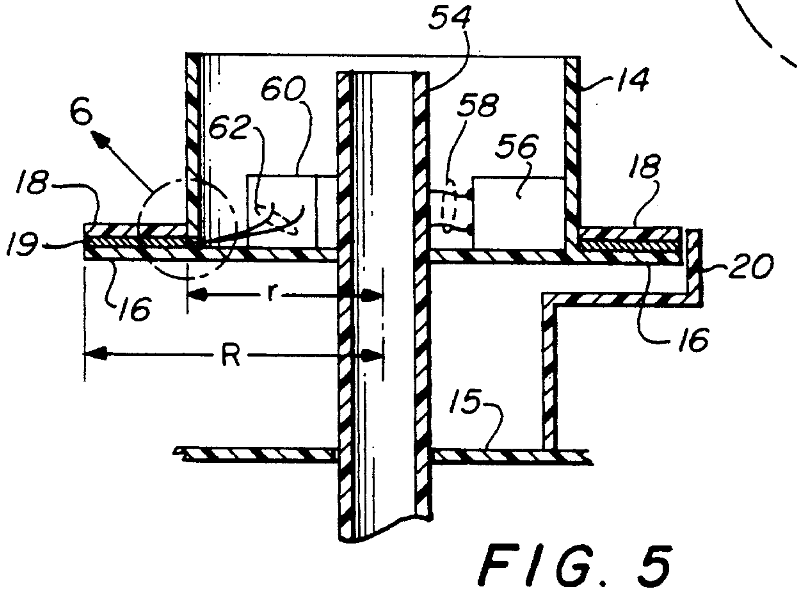
FIG. 5 is a cross-sectional view of the hollow control knob in FIG. 4 illustrating the horizontally projecting annular shoulder at the base of the knob on which the annular electroluminescent panel and the transparent plastic annular ring are placed for support and illustrating the power supply and electronic circuit within said control knob.

FIGS. 4, 5, and 6 illustrate the present invention in relation to a control knob such as that illustrated in FIG. 1. In FIGS. 4 and 5, it can be seen that the control knob 14 has a flat annular shoulder 16 extending outwardly from the outer circumference of the dial knob 14 substantially at the base thereof and having an outer diameter R and an inner diameter r, respectively. The flat annular shoulder 16 supports a flat electroluminescent annular ring 19 (shown in FIG. 5 and FIG. 6) on which is superimposed a flat annular transparent plastic ring 18 which has indicia 22 thereon. A reference mark support 20 is attached to the housing 15 and is held in relation to the indicia on the rotatable flat plastic annular ring 18. Inside the hollow interior of the knob 14 is a power source or battery 56 coupled by leads 58 to an electronic control circuit 60 which is a well-known converter that receives DC voltage and converts it to AC voltage on output leads 62 that are coupled to the electroluminescent panel 19. The leads 62 extend through an orifice 64 in the wall of knob 14. The electronic circuit 60 may have a built-in timer 66 such that the electroluminescent panel 19 will be illuminated for a predetermined period of time only and then automatically shut off to conserve power.

Figure 7:
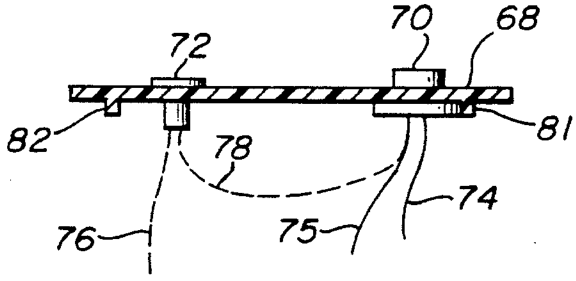
FIG. 7 illustrates a cover for the control knob of FIG. 4 and FIG. 5 and discloses a manually controlled switch and/or a photodiode that can be used to automatically energize and de-energize the control circuit under predetermined light levels.

FIG. 7 illustrates a cover for the hollow knob 14 that includes controls for the circuit therein. The cover 68 as shown in FIG. 7 may include a manually operated switch 70 that has output leads 74 and 75 that could be attached to the circuit at point 80 in FIG. 4 if one of the leads were broken at that point and leads 74 and 75 were coupled to them in series. Thus when switch 70 is operated, the power supply 56 would either be connected to the electronic circuit 60 or disconnected therefrom. If desired, the unit may be made to operate and turn ON automatically only when the ambient light level falls below a predetermined level. This can be controlled by a photodiode 72 adjusted in a well-known manner to couple its output lead 76 to lead 78 when the ambient light falls below a certain predetermined level. If lead 78 is coupled to lead 75 as illustrated and leads 74 and 76 are coupled to the broken lead at point X marked by the numeral 80 in FIG. 4, then the switch 70 could be left in the ON position and the electroluminescent panel would not be energized until the light level fell below a certain predetermined point. Of course, such circuit would not be necessary with a timing circuit 66 that allows the electroluminescent panel 19 to be energized only for a predetermined period of time. Shoulders 81 and 82 on the cover 68 secure the cover to the top of the knob 14. The control knobs 26 and 30 in FIG. 2 could be constructed as illustrated in FIGS. 4, 5, 6, and 7.

A control knob 36 such as that illustrated in FIG. 3 wherein the illuminated plastic ring is about the circumference of the control knob shaft is illustrated in FIGS. 8 and 9. As can be seen in FIG. 8, the knob 36 is rotatably mounted on shaft 84 surrounding inner shaft 98 and that extends into the body 35 of the camera or other device with which the knob is to be used. The shaft 84 extends outwardly from the body 35 a sufficient distance to hold the dial knob 36 a spaced distance away from the body 35. The flat electroluminescent ring 85 surrounds the hollow shaft 44 in the spaced distance between the body 35 and the hollow dial knob 36. The flat plastic ring 42 is attached to and covers or is superimposed over the electroluminescent ring 85 and carries the indicia 44 that moves rotationally past the reference mark 45 on the body 35 for determining the proper position of rotation of knob 36. An orifice 86 is formed in the upper portion of the hollow shaft 84 for receiving the power leads 88 from the electroluminescent panel 85 for connection to the electronic circuit output leads such as illustrated in FIG. 4. Again, a timing circuit such as circuit 66 shown in FIG. 4 may form part of the electronic circuit 60 used in this device and placed within the hollow interior 90 of control knob 36. The electronic circuit and battery have not been repeated in FIG. 9 for simplicity of the drawings. However, as indicated they would be the same as shown in FIGS. 4 and 5. Also as shown in FIGS. 8 and 9 is the cover 92 for the hollow knob 36 which may again include a mechanically operated switch 94 and a photodiode 96 for controlling the circuit as explained previously in relation to FIGS. 4 and 5. The outer shaft 84 of control knob 36 may be rotatably mounted about an inner shaft 98 or it may be as shown in FIG. 5, a single shaft.

Figure 10:
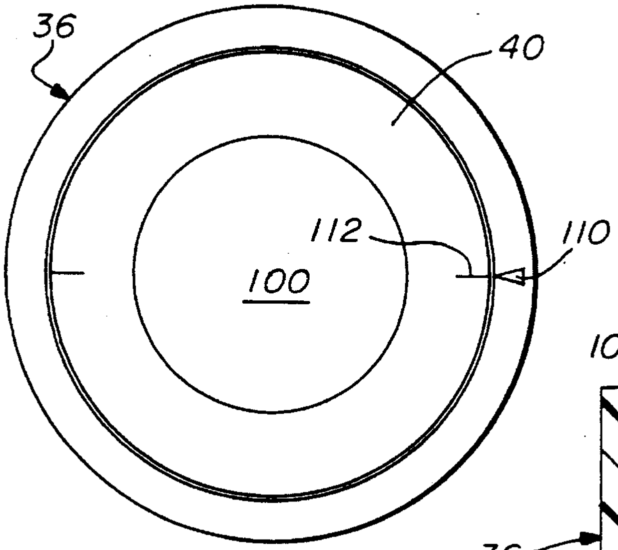
FIG. 10 is a plan view of a control knob showing the upper substantially flat surface of the control knob covering the hollow interior and having an annular recess in the upper substantially flat surface of the dial knob cover with the flat electroluminescent annular ring covered by the annular flat plastic ring and being placed in and attached to the annular recess of the upper flat surface for movement in relation to the dial knob.
Figure 11:
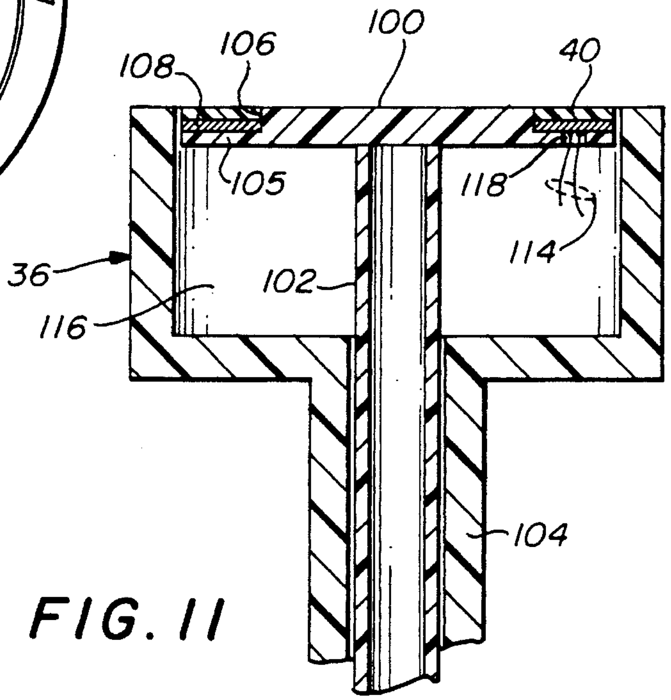
FIG. 11 is substantially a cross-sectional view of FIG. 10.

FIGS. 10 and 11 disclose a control knob of the type shown in FIG. 3 wherein the flat plastic annular ring 40 is on the upper flat surface of the control knob 36. As can be seen in FIGS. 10 and 11, the control knob 36 is again hollow and has a flat upper cover 100 that is mounted to a hollow shaft 102. The hollow shaft 102 extends downwardly into the camera or body unit 35 shown in FIG. 3 and is surrounded by shaft 104 of the control knob 36. An annular support surface 105 is formed by an annular recess 106 in the upper substantially flat cover 100 of the dial knob 36. The flat electroluminescent annular ring 108 is covered by the flat plastic annular ring 40 and is placed in and attached to the support surface 105 formed by the annular recess 106 of the upper flat cover 100 for movement therewith in relation to the dial knob 36. As can be seen in FIG. 10, indicia 112 on the flat plastic annular ring 40 can be compared to a reference mark 110 on the dial knob 36. Again, the electroluminescent panel 108 has electrical leads 114 extending into the hollow interior 116 of the hollow knob 36 through an orifice 118 in the support 105. The control circuit and battery would be placed inside the hollow interior 116 as explained previously and the connections to the electroluminescent panel leads 114 would be made in the same way and thus have not been shown in FIG. 11. Also, in FIG. 11, a manually operated switch and photodiode could be placed in the flat upper cover 100 also as explained previously.

FIG. 12 is a schematic representation of the elongated electroluminescent panel and its transparent plastic cover 48 illustrated in FIG. 3. As can be seen in FIG. 12, the body 35 of the camera remote control unit would have thereon an elongated electroluminescent strip 120 having electrical leads 126 extending through an opening 128 in housing body 35 for connection to a control circuit that is located either in the body 35 or within the interior of one of the other control knobs. The power leads may extend through shaft 98 in FIG. 9 into body 35 or may be extended from a control unit within the body 35. as discussed previously. Superimposed upon and attached to the electroluminescent panel 120 is the flat transparent elongated plastic panel 48 on which the indicia can be placed. Again, a mechanical switch 122 may be placed on the body housing and having leads 123 extending through the body 35 for coupling to the electronic circuit as explained previously. In addition, the photodiode 124 may have leads 125 extending through the body 35 to couple to the circuit as explained previously.

Figure 13:
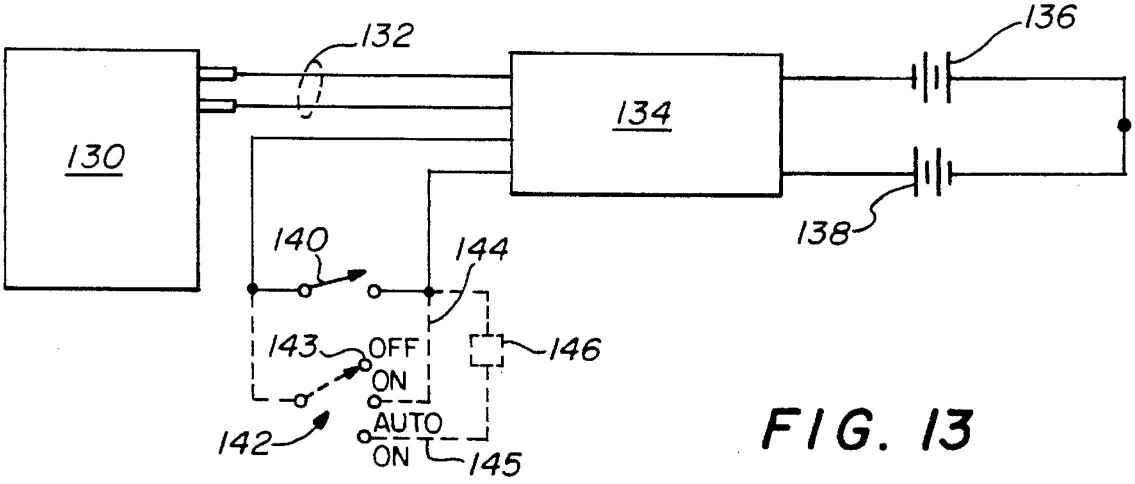
FIG. 13 is a schematic drawing illustrating an electroluminescent panel coupled to an electronic control circuit, a power supply, and a switch.
Figure 14:
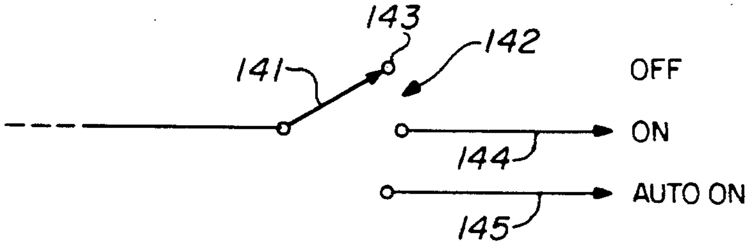
FIG. 14 illustrates a single-pole triple-throw switch which has OFF, automatic turn-ON and ON terminals that can be selected by the user.
Figure 15:
FIG. 15 illustrates a photodiode that may be used in the circuit for automatic control of the electroluminescent panel such as turning the panel ON only when a predetermined level of light exists.

FIG. 13 is a schematic diagram of a well-known circuit for illuminating an electroluminescent panel shown as 130 in FIG. 13. Power leads 132 connect the electroluminescent panel 130 to the electronic circuit 134 that is powered by batteries 136 and 138. Although two batteries are shown, clearly one could be used in place thereof. A switch 140 turns the electronic circuit 134 ON or OFF as desired. It may be desirable to add a switch 142 shown in phantom lines in FIG. 13 and in detail in FIG. 14 in place of the switch 140. This switch 142 would be a single-pole triple-throw switch with a first position 143 that is OFF, a second position in which the single-pole of the switch 142 is coupled to line 144 for the ON position, and a third position in which the single pole is coupled to line 145, which is an automatic ON line. As can be seen in FIG. 13, in phantom lines, line 145 is coupled to any well-known light-responsive circuit 146 that will close the circuit only when the light falls below a predetermined level. Such a switch is shown in FIG. 15 and may be a photodiode that is responsive to light. Such photo diodes can be placed in the circuit such that they will close a circuit only when the light falls below a predetermined ambient level. Instead of the light-responsive switch, a timing circuit could be used as explained previously that holds the current ON only for a predetermined period of time.

Thus there has been disclosed a novel device for back-lighting transparent panels associated with control knobs and on which indicia are placed to properly adjust the control knob for a given situation such that the indicia is illuminated by an electroluminescent panel during insufficient ambient light conditions. The electroluminescent panels are formed as annular rings covered by a transparent plastic annular ring and surrounding the control knob, recessed within the upper flat surface of the control knob, or placed around the rotatable shaft below the control knob. The electronic circuit and controls are advantageously placed within the hollow control knob and may be controlled manually or automatically by appropriate control units such as solar cells or photodiodes when the ambient light falls below a predetermined level. This, of course, conserves battery power.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A device for enabling proper indicia settings of a dial knob on a body with respect to a reference point on said body in insufficient light to see said indicia on said dial knob, said device comprising:

said dial knob having a hollow interior, an outer circumference, and a shaft coupled to said body causing a desired effect when said dial knob is rotated;

a flat strip of at least semitransparent material associated with said dial knob and carrying said indicia;

a flat illumination means having power leads and being placed under and in superimposed abutting relationship with said flat strip;

an electronic circuit and power supply connected to each other and placed within said hollow knob, said electronic circuit having output leads connected to said power leads of said illumination means; and an operable switch coupling said power supply to said electronic circuit energizing said illumination means to cause said indicia on said flat strip of at least semitransparent material, that is not visible because of insufficient ambient light, to become visible to allow proper adjustment of said dial knob with respect to said reference point on said body.

2. A device as in claim 1 further including:

a flat annular shoulder extending outwardly from the outer circumference and the shaft of said dial knob and having outer and inner diameters of R and r, respectively;

a flat annular electroluminescent panel forming said illumination means and a plastic annular panel forming said strip of semitransparent material;

said flat annular shoulder supporting said flat annular plastic panel in superimposed relationship on said flat annular electroluminescent panel; and an orifice in said hollow dial knob receiving said electroluminescent panel power leads for connection to said electronic circuit output leads.

3. A device as in claim 1 further comprising:

an upper, substantially fiat surface covering said hollow interior of said hollow dial knob;

an annular recess in said upper, substantially fiat surface covering said hollow interior of said dial knob; and said illumination means and said flat strip of semitransparent material being annular rings placed in and attached to said annular recess of said upper substantially fiat surface for movement in relation to said dial knob.

4. A device as in claim 1 wherein:

said dial knob shaft is hollow and extends into said body and is of sufficient length to hold said dial knob a spaced distance away from said body;

said illumination means at least partially surrounding said hollow shaft in said spaced distance between said body and said hollow dial knob;

said flat strip of semitransparent material carrying said indicia being attached to and covering said illumination means at least partially surrounding said hollow shaft; and orifices in said hollow shaft receiving said illumination means power leads for connection to said electronic circuit output leads in said hollow dial knob.

5. A device as in claim 1 further including a timing circuit forming part of said electronic circuit for energizing said illumination means only for a predetermined period of time when said switch is operated.

6. A device as in claim 1 further including a light controlled circuit coupled to said electronic circuit such that said electronic circuit can be energized with said operable switch only when the ambient light intensity falls below a predetermined level.

7. A device as in claim 6 wherein said light controlled circuit includes a photodiode that deactivates said electronic circuit until said ambient light intensity falls below a predetermined level.

* * * * *